(12) United States Patent
Schick

(10) Patent No.: US 6,837,189 B2
(45) Date of Patent: Jan. 4, 2005

(54) HOG FACILITY MANAGEMENT SYSTEM AND METHOD

(76) Inventor: Paul H. Schick, 3320 Scherer Rd., Kutztown, PA (US) 19530

( * ) Notice: Subject to any disclaimer, the term of this patent is extended or adjusted under 35 U.S.C. 154(b) by 0 days.

(21) Appl. No.: 10/256,135

(22) Filed: Sep. 27, 2002

(65) Prior Publication Data

US 2003/0094144 A1 May 22, 2003

Related U.S. Application Data

(63) Continuation-in-part of application No. 09/966,952, filed on Sep. 28, 2001, now Pat. No. 6,526,919.

(51) Int. Cl.[7] .............................................. A01K 29/00
(52) U.S. Cl. ...................................................... 119/840
(58) Field of Search .......................... 119/14.02, 14.03, 119/14.08, 520, 840, 842

(56) References Cited

U.S. PATENT DOCUMENTS

| | | | | |
|---|---|---|---|---|
| 4,617,876 A | * | 10/1986 | Hayes ......................... | 119/842 |
| 5,183,008 A | * | 2/1993 | Carrano ...................... | 119/840 |
| 5,579,719 A | * | 12/1996 | Hoff et al. ................ | 119/51.02 |
| 5,644,643 A | * | 7/1997 | Scofield et al. ............. | 382/110 |
| 5,673,647 A | * | 10/1997 | Pratt ........................ | 119/51.02 |
| 5,782,199 A | * | 7/1998 | Oosterling ................ | 119/14.02 |
| 6,095,086 A | * | 8/2000 | Aurik et al. ............. | 119/14.02 |
| 6,341,582 B1 | * | 1/2002 | Gompper et al. ........... | 119/840 |
| 6,526,919 B1 | * | 3/2003 | Schick ........................ | 119/840 |

* cited by examiner

Primary Examiner—Thomas Price
(74) Attorney, Agent, or Firm—Charles A. Wilkinson; Clinton H. Wilkinson

(57) ABSTRACT

A highly automated hog management system and method for housing, feeding and sorting hogs comprising a finishing barn partitioned into two separate pens each capable of holding at least 400 hogs in a large open area, with each room having a living or pen area and central shared but divided feeding area, such that through the adjustment of a gating and fencing system enclosing the feeding area, two pens of hogs can be sorted using a single electronic sorting scale, and wherein hogs are made to sort themselves by weight upon passing through the electronic sorting scale, which designates the animals as either light or heavy, and whereafter a diversion gate ushers them either into the regular feeding area with access back to the living area if they are designated as "light," or into a separate holding pen if they are designated as "heavy. In addition, light and heavy hogs can be sorted between pens rather than in each pen separately. A sick pen area at each end of the building, having its own feed and water supply, is also provided.

18 Claims, 14 Drawing Sheets

HOG FACILITY MANAGEMENT SYSTEM AND METHOD

RELATED APPLICATIONS

This application is a continuation-in-part of U.S. application Ser. No. 09/966,952, filed Sep. 28, 2001, now U.S. Pat. No. 6,526,919, by the same inventor and claims priority therefrom.

BACKGROUND OF THE INVENTION

1. Field of the Invention

The present invention pertains to arrangements for sorting pigs by weight and holding for market shipment, and more particularly to pen and feeding configurations in "wean to finish", or "finisher", facilities.

2. Preliminary Discussion

In the present practice of raising hogs for commercial use, such hogs are typically housed in large buildings or adjacent buildings comprised of several containment rooms, each of which is divided into a plurality of small rectangular pens per room, with each pen holding 15 to 50 and preferably 25 to 35 animals and having one gate per pen. While the basic concept of dividing a finishing building or barn into a number of separate pens has been standard practice for decades, the disadvantages of such a pen design or layout are numerous. For example, it is well known that confining hogs in small, overcrowded pens leads to stress and agitation and fighting amongst the animals, as well as contamination from wastes. In addition, each pen usually has its own feeder and waterer, so that caretakers must check each individual pen for an adequate supply of feed and water as well as good health of the hogs, which is very labor intensive and time consuming.

Another drawback of the traditional system is the time spent in sorting the hogs. At market time, each pen must be checked for hogs that meet market weight. This is usually done by chasing whole pens of hogs down an alleyway and forcing them across a scale. The hogs are then hand-separated, with heavier pigs entering the market truck, and lighter pigs being herded back to their respective pens. This method of sorting hogs by weight is very time-consuming, and furthermore poses a risk of injury to both humans and animals. Another type of sorter wherein hogs are sorted by size rather than weight is shown in U.S. Pat. No. 3,072,100 issued to H. E. Dustin, entitled "Animal Sorter," wherein the sorter is comprised of an adjustable gate sized so that smaller hogs can fit through the bars in the gate, while larger animals ready for market cannot.

An alternative method of sorting hogs by weight that is sometimes utilized in sorting hogs confined in small pens involves estimating weights by sight. However, estimating weights produces very inaccurate results, which mistakes can be very costly, since at the marketplace sort bonuses are typically awarded for hogs that fall within a specified weight range. Hogs that are not in this range do not receive a bonus, and in fact may be docked in price. Therefore, while it is more desirable to use a scale rather estimating weights manually, use of a scale is more costly and time consuming.

In addition, it is desirable to ship hogs with empty stomachs. Feed in the stomach can be worth up to 50 cents per pound, which cumulatively represents a significant expenditure, particularly for larger finishing facilities. In addition, if the hogs are shipped with full stomachs, a feed disposal problem at the packing plant results. It has also been found that if the hogs are held off feed for 24 hours before packing, the meat has a lower pH and as a result has a better taste. The only way to achieve empty-stomach shipment is to hold market hogs off of feed for 24 hours, which is impossible in a standard system because market weight and light weight animals are mixed throughout each pen. It is also often desirable to water hogs with electrolytes prior to shipping in order to help the animals to retain water and reduce water shrinkage. However, this is also impossible in the current practice of raising hogs because it is not cost-effective to feed watered electrolytes to an entire room or pen of market weight, as well as non-market weight, hogs.

Hogs are generally social animals, but, as indicated above, confinement in small pens can lead to stress and agitation. Over time, closely confined hogs become weaker and less healthy. This in turn can effect their eating habits and growth rate. Thus, it has been found that if the hogs are allowed to roam and mingle in a larger environment and are not confined to a small pen, they will be less agitated and kept in a calmer state. In addition, there will be less of a pecking order which inevitably develops in each small pen, since in a larger pen the dominant hogs will not be able to fight every other hog, which inability leads to fewer overall fights and consequent injuries. Sorting hogs by weight using an electronic scale is also easier in a large pen environment, since the hogs can be separated into different areas of the pen after sorting depending upon their weight. Still, the provision of an electronic sorting scale in each pen is costly, as the cost of such scales can usually range between five to ten thousand dollars or more. Since the profit margins of hog finishing buildings is usually quite low, the expense of providing a scale in each pen can make the entire operation cost prohibitive.

3. Description of Related Art

Numerous methods and arrangements for managing or sorting animals by size, weight or other criteria are available in the prior art. The following prior art patents related to sorting or separating of livestock or the like incorporating concepts bearing upon the present invention are known by the present inventor. None of such references, however, discloses a hog sorting gate and fencing system and method in a large pen building environment wherein a single stationary electronic sorting scale can be used to sort hogs in adjacent large pens as conceived by the present inventor. Neither do any of such references disclose the novel sorting methods and arrangements of the present invention whereby superior and effective management of hog finishing operations is obtained.

One common sorting method is to herd animals through a gate wherein upon exiting the gate they can be individually directed to different pens or holding areas. For example, U.S. Pat. No. 182,688 issued to A. Minor, entitled "Stock Separator," discloses an early gate system for separating livestock wherein two pivotable panels positioned near an entranceway funnel the livestock through a gate one at a time, and wherein a third panel positioned outside the exitway is manually swung from side to side depending on which direction it is desired to push the livestock.

Other arrangements wherein animals are guided through chutes into a desired holding area are also known. U.S. Pat. No. 2,050,527 issued to C. Grabe, entitled "Animal Chute," discloses a chute formed by a pair of parallel stationary fences having two swinging or alternatively positionable fence sections therebetween, so that the fence sections can be manipulated and positioned to channel livestock in a particular direction such as into a certain pen or corral. U.S. Pat. No. 3,545,407 issued to W. T. Moore, entitled "Animal Pen," discloses a pen comprised of a plurality of pivotable outer fence sections surrounding a chute-like passageway, wherein the outer sections can be positioned to direct a herd of animals as desired.

U.S. Pat. No. 4,136,641 issued to H. F. Hoffman, entitled "Livestock Sorting Gate," discloses a three-sided swinging gate pivotally connected in series so that it swings as a unit from side to side, thereby either opening or closing off entrances to opposing pens. U.S. Pat. No. 4,261,297 issued to E. Van Maarion et al., entitled "Animal Processing System and Cutting Gate," discloses another generally triangular swinging gate which can be situated so as to allow entry into or block entrance into various fenced areas. Van Maarion et al. also utilizes simple arcuate swinging gates in combination with the triangular gate to increase the effectiveness and versatility of the triangular gate. U.S. Pat. No. 4,552,096 issued to W. J. Forrest on Nov. 12, 1985, entitled "Sorting Gate Assembly," discloses a pivotable gate for use in a holding pen, which gate can be moved to various positions to corral or sort the animals. While such gates are used to urge or force animals in a particular direction or into a particular pen, the animals are separated by visual inspection rather than by weighing.

Another common sorting arrangement is to provide a doorway or opening through which only animals below a predetermined size can fit. One such arrangement is illustrated in U.S. Pat. No. 1,381,797 issued to H. D. Caspers, entitled "Stock Separator," wherein the distance between a pair of vertical rollers is adjustable so that only hogs smaller than a selected size can fit through such opening. Another example is U.S. Pat. No. 1,788,244 issued to J. E. Larson, entitled "Stock Separator," which discloses a feed house having openings doors adjustable so that while smaller pigs can pass through the doors, larger pigs cannot and therefore eat less. As indicated above, U.S. Pat. No. 3,072,100 issued to H. E. Dustin, entitled "Animal Sorter," discloses a sorter for selecting and segregating hogs which are ready for market, comprising an adjustable gate wherein smaller hogs can fit through the bars in the gate, while larger animals cannot. Other similar arrangements can be found in U.S. Pat. No. 3,861,359 issued to R. Pals, entitled "Hog Sorter Gate Device," U.S. Pat. No. 3,894,516 issued to M. J. Schaefer, entitled "Animal Sorting Gate," U.S. Pat. No. 4,019,464 issued to T. G. Miller, entitled "Animal Size Sorting and Control Gate" and U.S. Pat. No. 4,572,109 issued to E. T. Nixon, entitled "Animal Separator Gate." While over time such sorter gates divide the animals into groups of larger and smaller size, none of such gate systems represents a significant improvement over merely visually estimating the size of the animals. Such systems simply cannot segregate animals with sufficient accuracy for the packer to receive sort bonuses for meeting packer weight specifications.

Various gates or chutes for sorting animals by weight are also known. U.S. Pat. No. 4,134,366 issued to J. L. Elliot, entitled "Animal Sorter," discloses a sorter wherein the end of a chute is aligned with either a first or second exit depending upon the weight of the animal. If the weight of the animal exceeds the weight of a counterweight, the first exit is opened, while if the weight of the animal is less than the counterweight, the second exit is opened. U.S. Pat. No. 4,138,968 issued to J. L. Ostermann, entitled "Automatic Sorting Device for Livestock," discloses a chute also having a weighing means therein such that the weight of the animal determines which of two passageways is opened.

In U.S. Pat. No. 4,280,448 issued to J. L. Ostermann, entitled "Livestock Sorting Device," animals are individually weighed in a chute and then directed into one of two fenced areas. Ostermann shows a manual method for directing hogs to a particular pen based on weight. To use the sorter, an entrance gate is opened by the operator, allowing an individual hog to enter, with the exit blocked by a second gate. After the weight of the animal is determined, the second gate is opened and the hog is directed to one of the fenced areas by manually manipulating a gate operating arm. One of such areas is designed to hold sorted animals ready for market, while the other area is for animals not ready for market.

U.S. Pat. No. 4,162,682, issued to W. K. Miller, entitled "Pivotal Sectionalized Wall for Hog Raising Enclosure," discloses a gate system for use in hog barns of the conventional type wherein hogs are housed in small individual pen areas, rather than in large open finishing barns or buildings. In Miller, sections of the walls of multiple pens can be moved for ventilation or the like using mechanical interconnection.

U.S. Pat. No. 5,878,695 issued to J. F. Gent, entitled "Extendible Hog Gate and Confinement Facility Gate System," discloses a more recent hog pen forming gate, wherein each gate apparently has a stationary portion and a pivotable portion. Such gates allow the size of the pens and walkways between the pens to be varied depending on the space required or the number of hogs in a pen.

More recently, electronic identification or sorting systems have become increasingly common. U.S. Pat. No. 5,183,008 issued to J. A. Carrano, entitled "Livestock Sorting System Having Identification Sensor and Gate Mounted Exit Switch," discloses a sorting system which uses a sensor to read electronic identification tags on livestock, which sensor then causes a gate to move to either a first or second position. Carrano uses electronic identification, rather than size, weight, or some other factor to sort the animals. U.S. Pat. No. 5,595,144 issued to U. Löher, entitled "Device for Sorting Animals," discloses another sorter which utilizes electronic sensors to direct animals into a particular area. A first sensor in the passageway identifies the animal, and a second sensor positions the gate. The two sensors are spaced apart so that the device can quickly sense and respond to different animals to be sorted. U.S. Pat. No. 5,979,365 issued to K. Sorraghan et al., entitled "Animal Sorting Module," discloses a passageway for sorting animals which employs cylindrical rollers at the entry and exit points of the passageway. Such rollers are preferably operated by a computer which reacts to sensors on the system to detect particular animals, and which close around the flank of the animal to prevent a following animal from entering the passageway at the same time. Sorraghan et al. presents a solution to the problem of more than one animal trying to squeeze into the passageway at the same time.

U.S. Pat. No. 5,579,719 issued to S. J. Hoff et al., entitled "Method and Means for Quasi Ad-Libitum Feeding for Gestation Sows in Loose Housing," discloses an improved electronic identification and feeding system for gestating sows. Gestating sows are kept in a confined area having a separate feeding area. To enter the feeding area, hungry sows, wearing a computer scanable responder tag, pass through a one-way gate with a scale, wherein the tag number is read by the computer. Once the sow and her weight are identified, the computer determines which feed pen the sow should be directed to, and the gate to such feeding area is opened. If the feeding area is currently full, the sow will be passed back to a confined bedding area. The sorting systems which utilize an electronic sensor to identify individual animals are expensive, and are not usually necessary for sorting hogs that are ready for market from those that are still too light, although the present inventor may include an electronic sensor means to detect whether or not an animal is currently on the scale, and in addition none of such references includes a gate system similar to the present system.

U.S. Pat. No. 6,135,055 issued to W. C. Pratt on Oct. 24, 2000, entitled "Cattle Management System and Method," discloses a state-of-the-art, high tech system for monitoring and keeping track of characteristics of each individual animal. As cattle are passed through a chute one at a time, vital statistics are recorded wherein a computer automatically directs the animal either to a shipping pen or a feeding pen. The Pratt system also keeps track of statistics up until and including the slaughter process.

Finally, at least one reference showing a finishing barn design wherein the hogs are held in a larger communal setting is also known. U.S. Pat. No. 4,442,792 issued to A. C. Nehring, entitled "Hog Finishing Building," discloses a barn arrangement wherein the hogs are not confined to small pens but are allowed to move around and mingle. The feeding area is centrally located, and the floor is slatted to allow waste to fall between the floor boards. Nehring also shows several interior side and end walls, but does not include any hog segregating or weighing devices, or a pivotable fencing arrangement, and is not directed to weighing and sorting the hogs.

The inventor is also aware that a Canadian company, K&L Technical Services, Ltd., is manufacturing a sorting scale under the name the "Super Sorter." Such sorter is placed in a common area between a pig barn and feeding area, so that the pigs can be made to pass through the sorter on the way to the feeding area. The sorter then weighs the pigs and directs pigs that have reached market weight to the shipping pen, while light pigs are directed to the feeding pen. While the above sorter is used in an open pig barn similar to the present system, it is not used in combination with a gate system wherein such barn is divided into two open pens wherein a single weighing and sorting scale can be utilized to weigh and sort hogs in both pens, as well as between pens.

Despite the significant advances in animal sorting and management systems known in the prior art, there is still a need for a more efficient finishing barn design wherein hogs are not held in small groups in a plurality of small pens, but rather are placed in large pens so that they can move around in a larger area, which reduces stress and keeps the hogs in a calmer state and enhances growth. In addition, such large pens may have a centralized feeder and accurate sorting system wherein the animals safely sort themselves by weight into groups ready for market and groups which are not. In addition, there is a need for a system wherein two large pens can utilize a central weighing, sorting and feeding area, and wherein the hogs can be sorted between pens in addition to within such pens, thereby decreasing labor, set-up, and maintenance costs of the system while enabling producers to better manage and monitor hog growth in such pens and increase profits.

OBJECTIVES AND SUMMARY OF THE INVENTION

The present invention provides a hog facility management system and method which meets the objective of minimizing labor, expense, and maintenance costs by growing hogs in a large pen rather than small pen growing or growth environment and by allowing hogs in such large room growing or growth environment to sort themselves by weight through a centralized feeder and holding pen layout, and providing a single alleyway through which the hogs are run for market loading.

Other objectives are to provide a system and method aforesaid that:

assures accuracy in sorting hogs by weight in order to achieve sort bonuses without running individual hogs over a scale by hand;

minimizes injury-risk to both animals and humans;

ensures efficiency in all hog-growing operations including feeding, housing, watering, monitoring and sorting;

enables the use of a single electronic sorting scale per two-pen room, allowing the producer to purchase and maintain a minimal amount of equipment for a self-sorting operation;

allows for the holding of a group of marketable hogs in a separate holding area;

allows for a group of marketable hogs to be selectively held off feed for any amount of time in order to guarantee empty stomach shipment, thus increasing profits and decreasing work at the packing plant;

allows for a group of marketable hogs to be fed watered electrolytes for any amount of time, in order to reduce water shrinkage;

enables loading to be accomplished efficiently and in a reduced amount of time, thus reducing stress on the producer and animal;

enables hogs to be kept in a calmer state during growing due to the presence of less confinement and more area to move and lay out of drafts;

minimizes fighting through the elimination of a dominant hog, thus eliminating a pecking order due to the fact that one hog cannot battle several hundred animals;

allows hogs to be sorted by weight not only within each pen but also between pens, thereby enabling slower growing hogs to be grouped together so that their growth can be supplemented with special feed or diet and more easily monitored.

To achieve these and other objectives, a hog finishing building consists of at least one room, capable of housing over 800 head per room in two separate pens, with a single feeding area contained in each pen, centrally located within the building. Waterers are installed in the feeding area, as well as along the holding pen center partition. The two pens in a room are separated by a fencing and gating system with an electronic sorting scale forming part of the fence, located near the entrance to the feeding areas. A diversion gate forms the central portion of the fence, pivoting from the front end of the scale to one of three fixed fence locations.

In one embodiment, the holding area is located in a portion of the pen or living areas stemming from the lower portion of the feeding areas. Under normal growing conditions, the holding area consists of two fixed fences, with the lower fence stemming or originating from the feeding area, parallel to the alleyway wall, and running the majority of the pen length. The second holding area fence extends from the feeding area, approximately down the center of the pen, and to near the opposite end. Waterers are contained in the holding area along the length of the lower fence. The fencing leaves the option to install two removable gates at the time of sorting for market in order to hold hogs in different sized groups. Another removable gate is also present at the entrance to the feeding area and allows hogs to be diverted onto the scale. The scale is either opened or blocked off by an additional removable gate.

Directing hogs to a "heavy weight" holding pen and "light weight" living area is accomplished through the placement of the aforementioned centrally located diversion gate, as well as a removable and interchangeable gate running from one of two horizontally opposite fixed points produced by extensions on the scale. The gate ends at the beginning of the lower fixed fence.

The feeding area consists of several two-sided horizontal feeder rows, adjoining the area's fence partition on the outermost side and running toward the central pen partition. The lowermost feeder row can be gated into the holding area at market sorting time. In addition, a removable gate can be placed at the entrance to the holding area, excluding the aforementioned feeder row, in order to hold the animals off of feed. Between the feeders are two one-way gates located on the outermost feeding-to-living area partition, and allowing hogs access back to the living area. The feeding area is partitioned by a rectangular gating/fencing system which runs vertically through the room's center, horizontally along the alleyside room partition, vertically along the feeder's outer edges, and horizontally near the building's outer wall. A sick pen area is located at the outer end of each pen, each having its own feed and water supply, allowing the producer to segregate sick or lame animals and still maintain the benefits of a large pen environment for the rest of the herd. All removable free-standing gates are held upright through the use of floor to ceiling telescoping poles at each end.

In another embodiment, a single holding area is provided, with hogs in both pens being sorted together into such holding area. In addition, hogs are sorted between pens, which enables the producer to precisely control the growth and feed of the animals. This can be done by keeping lighter weight hogs in one pen where they can be fed higher protein or growth enhancing feed, while heavier weight hogs are grouped together and are fed a normal feed. Such system, utilizing a single electronic sorting scale, further reduces equipment and maintenance costs, increases sorting precision and therefore sort bonuses, and is much less labor intensive than other known hog finishing facilities.

DETAILED DESCRIPTION OF THE INVENTION

Figure 1:
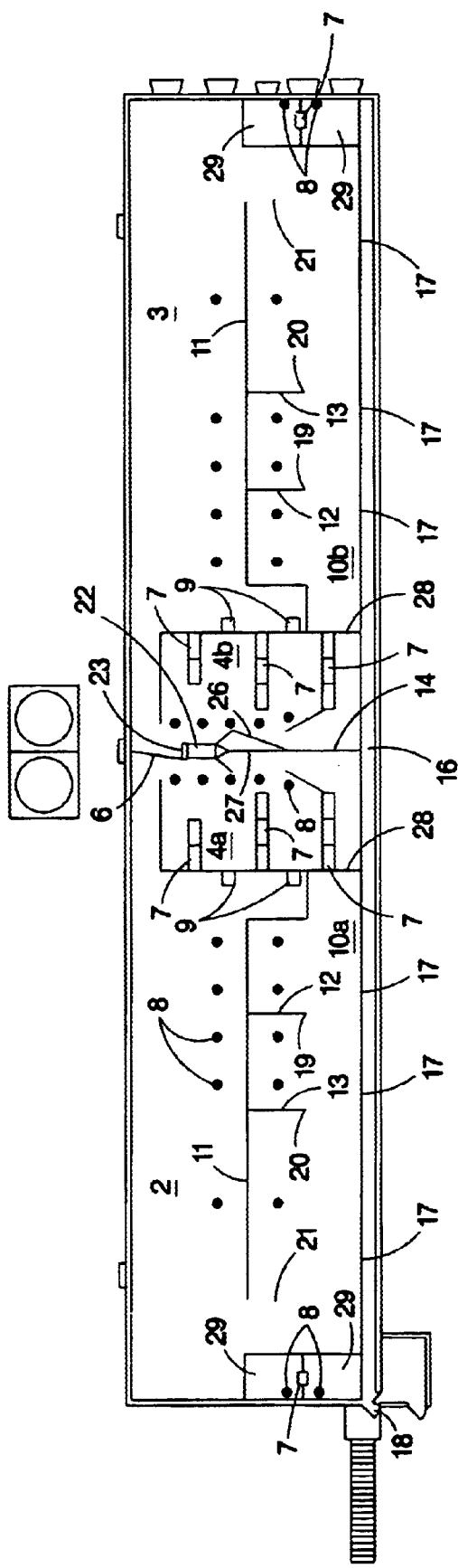
FIG. 1 is an overhead view of a first embodiment of an entire one-room self-sorting hog facility under normal growing conditions.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings the invention may be readily understood.

A highly automated hog management facility and method for housing, growing, feeding and sorting market hogs in large-pen environments of 400 or more animals in open areas or rooms is provided. Such method and system enables hogs to sort themselves by weight by requiring them to pass through a single centrally located electronic sorting scale in order to access a central feeding area equipped with both feeders and waterers. The means by which animals can enter the feeding area is varied depending upon whether the hogs are under normal feeding conditions or whether sorting of hogs for market is required. During normal feeding conditions, the fencing system is configured so that the hogs can enter and exit the feeding area freely. At some point during normal feedings, it is desired that the hogs also be allowed to enter the feeding area by passing through the electronic sorting scale so that the hogs, who are quite intuitive and curious in nature, will over time learnm that access to the feeding area can be gained by passing through the such scale. When it is desired to sort the hogs by weight, the fencing is positioned so that hogs can no longer enter and exit the feeding area freely, but must cross over the electronic sorting scale to enter the feeding area. Since the animals have been previously taught to use the scale, they will voluntarily pass through such scale so that the system becomes self-sorting. The scale will designates the animals as either "light" or "heavy." Upon exiting the scale, a diversion gate will, depending upon the calculated or determined weight of individual hogs, usher such hog either into the regular feeding area with the normal one-way access back to the living area if they are designated as "light," or, if designated as "heavy," into an alleyway or corridor formed by movable gates which leads to a holding pen area. The size of the holding pen area is adjustable to accommodate three different sized groups of sorted or market ready hogs. The holding area encompasses part of the pen or living area and includes access to at least a single side of one of the feeders in the feeding area, although such access may be blocked if it is desired to hold the hogs off of feed. Hogs in the feeding area can also be given special watered electrolytes if desired. Each holding pen opens directly into a single alleyway through which hogs can be passed and then loaded onto a market truck. Through the adjustment of the gating and fencing system, both pens can be sorted using a single electronic sorting scale, with the capability of sorting a single pen daily. A sick pen area is provided at each end of the building, which areas preferably have their own feed and water supply.

In a second embodiment, hogs can be sorted between pens as well as within each pen. Such arrangement allows one of the holding areas of the first embodiment to be eliminated, so that now hogs from both pens are sent to the same shared holding area. Less gating, and therefore less maintenance and cost, is required in such second embodiment. In such embodiment, barrows or castrated males and gilts, or females, are preferably initially placed in separate pens so that the gilts, which typically grow at a slower rate than the barrows, can be fed a different, higher protein diet than the barrows. Faster growing or "heavy" gilts can then be sorted into the barrow pen, while slower growing or "light" barrows are sorted to the gilt pen so that they can benefit from the high protein diet. As explained in detail below, animals can be continually sorted from either pen into the holding area and between pens using a single electronic sorting scale positioned between such pens.

FIGS. 1–6 illustrate a preferred embodiment of an automated hog management facility including a method and system for housing, feeding and sorting market hogs. FIG. 1 is an overhead view of an entire single room self-sorting hog facility 1. Room 1 is generally divided into separate large pens 2 and 3 which make up the facility under normal growing conditions. Pens 2 and 3 are typically large enough to hold at least 400 hogs, with a typical number being approximately 550 hogs per pen. Although there is no set maximum or minimum number of hogs which can be housed in each pen, at some point there will be either too many hogs so that they cannot all easily access the feeding area, or too few so that the operation is not cost effective. Contained within pens 2 and 3 are feeding areas 4a and 4b which, during normal growing conditions, are entered through the opening in the fencing left by the removal of gate 5, shown in FIGS. 4 and 5 placed between pen 2 and feeding area 4a and shown in FIGS. 2 and 3 placed between pen 3 and feeding area 4b. The floor of pens 2 and 3 and feeding areas 4a and 4b is preferably at least partially slatted so that waste and excrement passes between the slats into a pit or deposition area below the floor (not shown).

Feeding areas 4a and 4b may also be thought of as a single central feeding area that has been divided or made separate by the combination of, from bottom to top in the FIGS., stationary fence 14, removable gate 26 or 27, scale 22, and pivoting gate 6 which pivots from a point opposite the scale by a suitable pivot mechanism. Each feeding area 4a and 4b preferably contains three rows of feeders 7a, 7b, and 7c, all of which can be accessed on both sides by any hogs during normal growing conditions. Also positioned throughout living areas 2 and 3 and feeding areas 4a and 4b are waterers 8, which waterers can be of any known type such as an adjustable hog nipple, product number 1000-0743 manufactured by Edstrom Industries of Waterford, Wis., or other hog fountain. From the feeding areas 4a and 4b, hogs can return to the pen areas 2 and 3 through one-way gates 9 or, under normal growing conditions, through the opening between the living areas and feeding areas left by the removal of gate 5.

During normal growing conditions, electronic sorting scale 22 is usually made inaccessible to the hogs by the placement of gate 6 between the outer wall of building 1 and one side of sorting scale 22, and entrance gate 23, which is positioned across the front entrance of scale 22. As shown in FIG. 1, gate 6 prevents hogs in pen 2 from gaining access to the scale, while entrance gate 23 prevents hogs in pen 3 from accessing the front of scale 22. However, as explained below, it is also at times desirable to allow the hogs access to the feeding area through the opening left by the removal of gate 5, shown in position in FIG. 2, and through scale 22 at the same time so that the hogs have open access to the feeding area during normal growing periods and all have sufficient access to food, but will also over time learn that they can also gain access to the feeding area through such scale. Scale 22 should be capable of automatically and continuously weighing the hogs, such as the "Super Sorter" scale manufactured by K&L Technical Services of Alberta, Canada, although other gated animal weighing devices wherein the animal can be sorted into a different holding area depending upon its actual weight can be used. The scale will typically be calibrated with several major set points. For example, a minimum weight point may be set to indicate to the scale that there is a hog on the scale, although other means such as an electronic eye can be used to indicate to the scale that there is a hog on such scale, so that the scale can be either simply weight driven or electronically driven. A maximum weight is also preferred which helps the scale determine whether more than one pig is on the scale and therefore the gate should not be closed. One or more sort weights is also used so that if the hog is above a certain weight such hog can be directed in one direction while if the hog is below such weight it can be directed in another direction as shown below.

Also shown in FIG. 1 are holding areas 10a and 10b, which encompass a significant portion of pens 2 and 3, respectively. Holding areas 10a and 10b are in an open position under normal growing or non-sorting conditions, so that hogs can roam freely throughout the entire living or pen areas 2 and 3, including holding areas 10a and 10b. Holding areas 10a and 10b are formed by stationary horizontal fence 11, which extends generally centrally along a major portion of pens 2 and 3, and removable gates 12 and 13 which, as shown below, allow the holding areas to either be in one of three possible sizes or divided into more than one section if desired. The gates and fencing used with the gating system of the present invention may be of several types, but are preferably made from aluminum and have sufficiently narrowly spaced bars to prevent the pigs from getting their heads stuck between the bars. Each of the removable/interchangeable gates used in the gating system is held upright preferably through the use of floor-to-ceiling telescoping poles, not shown. Sick pen areas 29 are available for use by sick or lame animals, each being supplied with their own waterers 8 and feeders 7. Such pens are shown in FIG. 1 situated on the ends of the building 1 in pens 2 and 3, but may be otherwise situated as long as the sick animals are separated from the healthy animals.

Figure 2:
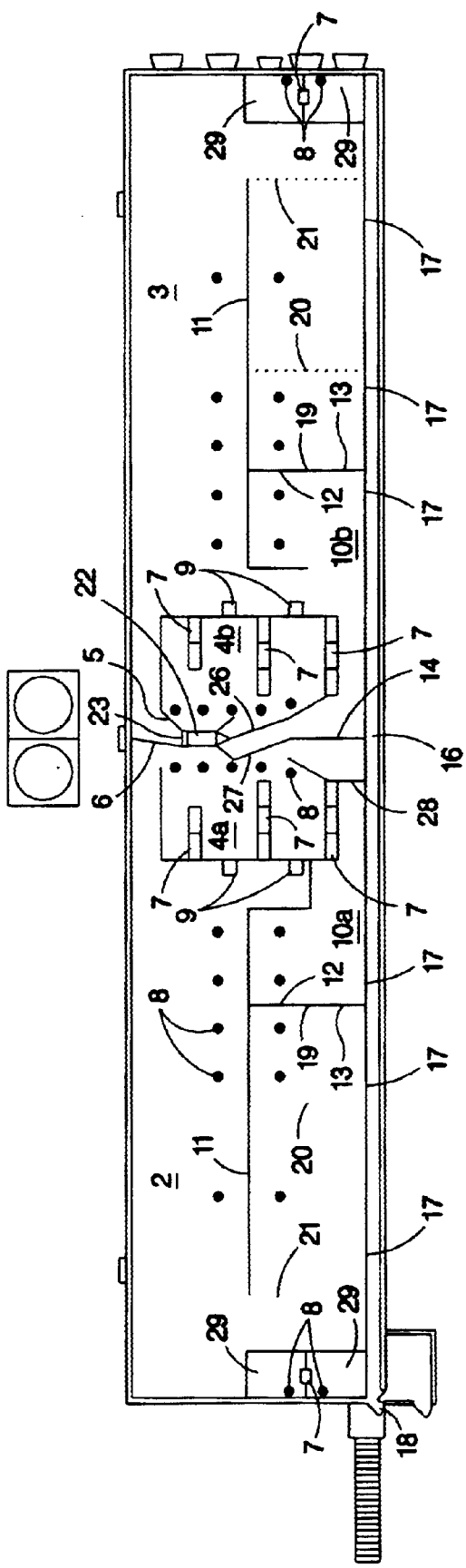
FIG. 2 is an overhead view of the entire one-room self-sorting hog facility of FIG. 1 as configured during hog sorting of the right side pen, and market-holding of the left side pen.

FIG. 2 illustrates the single-room self-sorting hog facility 1 shown in FIG. 1 configured for or during hog-sorting in pen 3 and for market holding in pen 2. Typically, hogs will not be sorted until they have reached a weight of approximately 150 pounds so that they do not get hurt upon entering or exiting scale 22. Holding area 10b of pen 3 is reconfigured during hog sorting, with gates 12 and 13 forming the end wall of such holding area situated in either position 19, as shown in FIG. 2, or in positions 20 or 21, which positions are shown in dotted lines in FIG. 2, for holding a quarter, half or whole truckload sort, respectively. Pen 2 is configured for market holding, with gates 12–13 and 28 containing previously sorted market hogs (not shown) in holding area 10a allowing such hogs access to one side of feeder 7e. Waterers 8, located along the holding pen side of stationary wall 11, provide water or, additionally, watered electrolytes to hogs in the holding pen, so that a separate water line is usually required in such areas.

Figure 3:
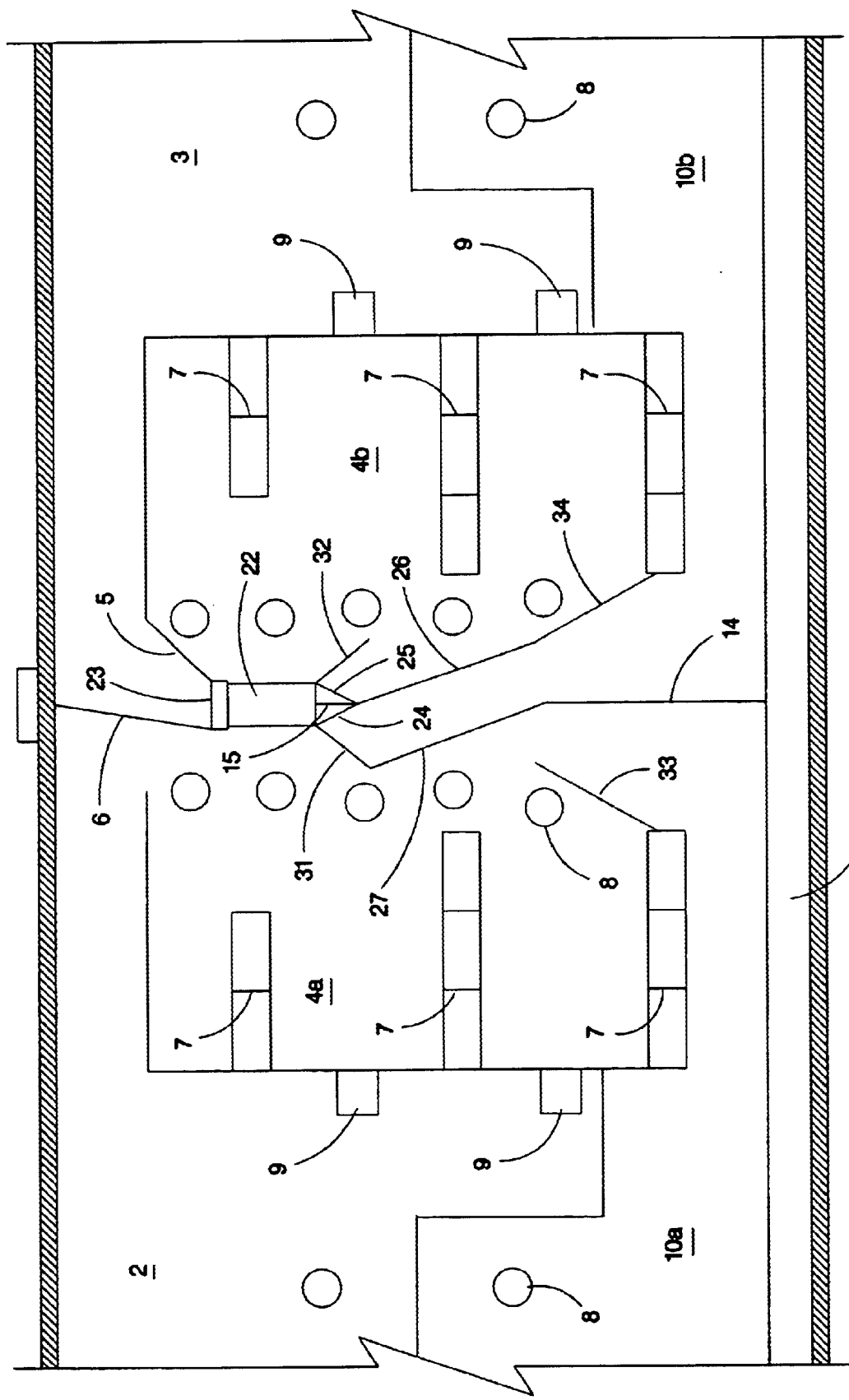
FIG. 3 is an overhead close up view of the feeding areas as shown in FIG. 2 during hog sorting of the right side pen in a one-room self-sorting hog facility.

FIG. 3 is a close up view of the reconfigured feeding areas 4a and 4b during sorting of hogs living in pen 3. First, gate 5 is positioned between the living area of pen 3 and feeding area 4b to prevent hogs from entering feeding area 4b simply by walking freely through the opening now blocked by gate 5 as is possible during normal growing conditions. In addition, gate 6 is positioned on the far side of scale 22 with respect to pen 3, so that hogs can only enter feeding area 4b of pen 3 by crossing electronic sorting scale 22 through the corridor created by gates 5 and 6. In addition, entrance gate 23, shown in FIGS. 2 and 3 positioned over the front of scale 22, pivoted to the side or removed. In addition to positioning gates 5 and 6, gate 26 must be positioned on one end to the rear tip of scale 22 and on its other end to gate 34 extending from feeder 7e. Such arrangement effectively blocks access to the majority of feeding area 4b from holding area 10b. At the same time, one end of gate 27 is simultaneously secured to gate 31, which gate 31 is attached on its other end to sorting scale 22. The other end of gate 27 is attached to gate 14, thereby forming a narrow corridor or passageway from scale 22 into holding area 10b between gates 26 and 34 on one side and gates 31, 27, and 14 on the other side.

Upon single file entrance on to scale 22, hogs are weighed and determined to be either "heavy" or "light." If designated as "heavy," diversion gate 15 pivots to allow access to exit or opening 24, allowing the animal to travel down the corridor formed by the placement of gates 26 and 27 described above, and into holding area 10b, in which, as also indicated above, gates 12 and 13 have previously been adjusted in position 19, 20, or 21, as shown in FIG. 2, to accommodate different sized sorts, or sorted hogs. These hogs now have access to one side of feeder row 70 and several waterers 8, so that the producer now has complete and exclusive control over the diet of such "heavy" group of market hogs. Such hogs in holding area 10b can also be held off of feed completely through the placement of gate 28 at the entrance to holding area 10b, as shown by the placement of gate 28 between the feeding and holding areas 4a and 10a of pen 2 in FIG. 3.

If a hog is designated as "light" upon entrance on to scale 22, referenced in FIG. 3, diversion gate 15 pivots to allow access to exit or opening 25 leading back into the normal feeding area 4b, minus one side of holding pen feeder 7e being used by hogs in holding area 10b. The hog can now exit back into pen or living area 3 via one-way gates 9, and continue with normal growing, feeding and watering habits until being deemed "heavy" during a future sorting. In a slightly alternative arrangement, diversion gate 15 may be set so that "light" hogs are not blocked so that they can immediately re-enter their feeding area, but when a "heavy" enters the scale, it will be blocked and the diversion gate wilt pivot to allow the hog through the "heavy" exit, usually into the holding area. Regardless of whether a swinging or pivotable gate in the middle or the gate is used or the gate is set so that the gate covers one opening in a default position, the principle of diverting "light" or "heavy" hogs is the same.

Animals directed into holding area 10b from pen 3 will remain there until market truck pickup, while, on a second day or period, pen 2 may be sorted in the same way. This is accomplished through reversing the gating layout from the positions shown in FIGS. 2 and 3 to the positions shown in FIGS. 4 and 5, using the same removable gates. Gates 5 and 6 are moved so that the hogs can only enter feeding area 4a of pen 2 by crossing electronic sorting scale 22, with entrance gate 23 now removed. Gate 5 is situated in the opening between living or pen area 2 and feeding area 4a, while gate 6 is positioned between the wall of room 1 and the far side of scale 22 with respect to pen 2, forming a short corridor from pen 2 to scale 22. In addition, gate 26 is moved from the position shown in FIG. 3 wherein it is connected between the rear tip of scale 22 and gate 34 to a position secured between gate 32 extending from scale 22 and gate 14. In addition, gate 27 is moved from the position shown in FIG. 3 wherein it is secured between gate 31 and 14 to a position secured between the rear tip of scale 22 and gate 33. In sorting either pens 2 or 3, gates 5, 6, 26, and 27 are preferably positioned and gate 23 removed at least a few hours prior to a sorting operation so that the hogs can become accustomed to passing through the scale to reach the feeding areas via the scale. The hogs will then continue passing through the scale in an attempt to reach the feeding troughs the next time they are hungry and will in effect sort themselves if the scale is an automatic scale.

Figure 4:
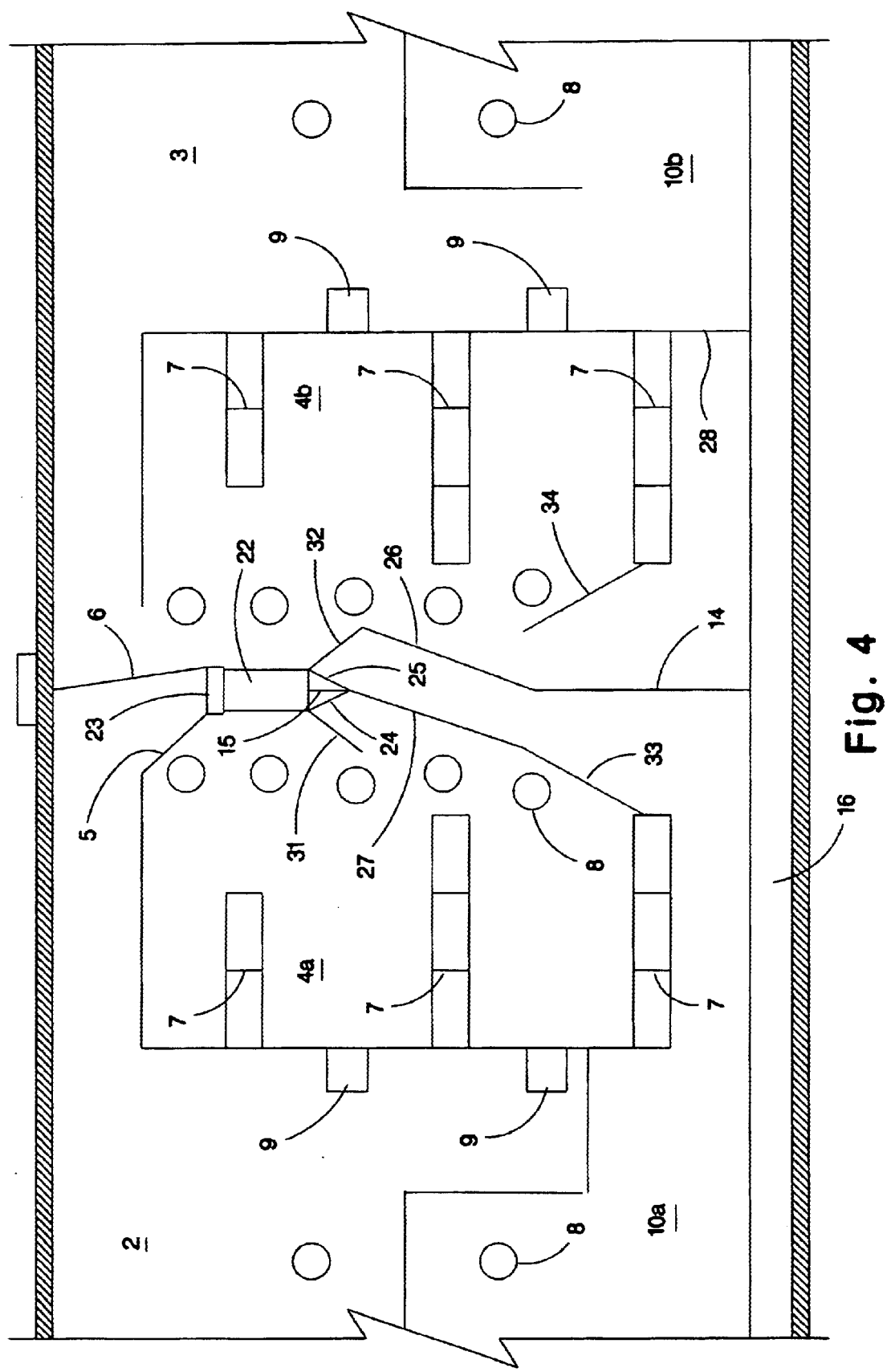
FIG. 4 is an overhead close up view of the feeding areas of the embodiment shown in FIG. 1 during hog sorting of the left side pen in a one-room self-sorting hog facility.
Figure 5:
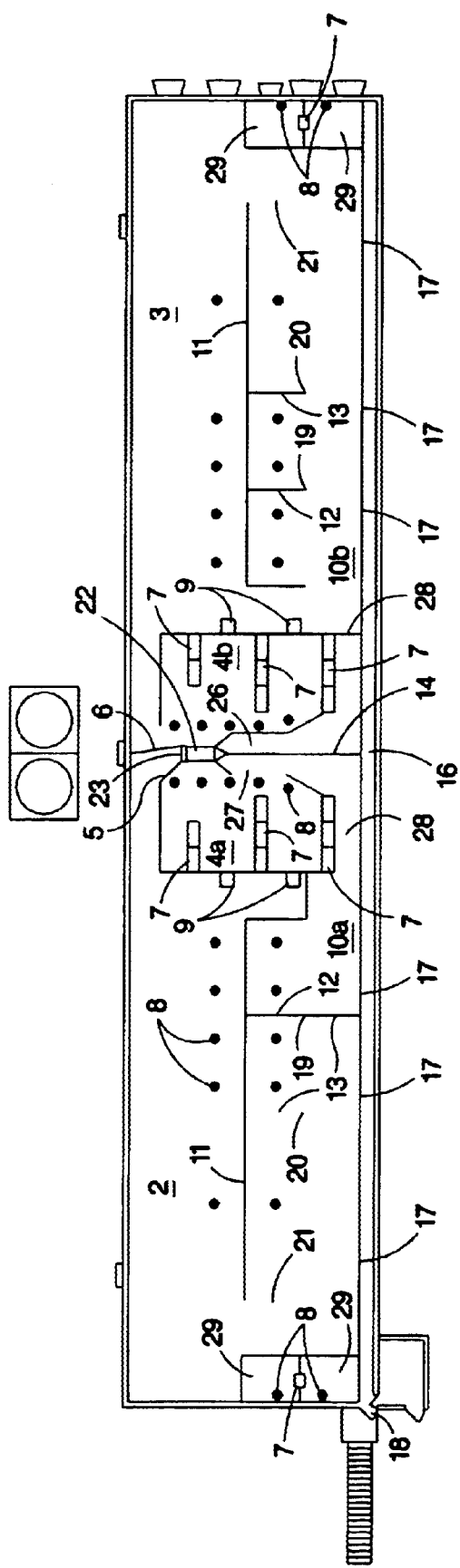
FIG. 5 is an overhead view of the entire one-room self-sorting hog facility as configured during hog sorting of the left side pen.

Referring still to FIGS. 4 and 5, wherein sorting of pen 2 is shown upon single file entrance on to scale 22, each hog entering the scale is weighed and determined to be either "heavy" or "light." If designated as "heavy," diversion gate 15 pivots to allow access to exit or opening 25, forcing the animal to travel down the corridor formed by the placement of gates 32, 26, and 14 on one side and gates 27 and 33 on the other side, and into holding area 10a of pen 2, the size of which holding area has previously been adjusted to hold hogs via placement of gates 12 and 13 in either position 19, 20 or 21. These hogs now have access to one side of a feeder row 7e of feeding area 4a and one row of waterers 8, allowing the producer complete and exclusive control over the diet of such "heavy" group of market hogs. Hogs in holding area 10a can also be held off of feed completely through the placement of gate 28, at the entrance to holding area 10a.

If a hog in pen 2 is designated as "light" upon entrance to scale 22, referenced in FIGS. 4 and 5, diversion gate 15 pivots to allow access to opening 24 and wherein the hogs can gain access back into the normal feeding area 4a in pen 2, minus the holding pen feeder row side of feeder 7e being used by hogs in holding area 10a. The hog can now exit feeding area 4 via one-way gates 9 back into pen 2, and continue with normal growing, feeding and watering habits until such hog is deemed "heavy" during a future sorting.

When hogs in one or both of pens 2 and 3 have been sorted into holding pens 10a and 10b, and the market truck arrives, "heavy weights" hogs exit the room through one of gates 17 between the holding areas and alleyway 16, which runs along the entire length of the room 1. The hogs are then herded down alleyway 16, exiting through door 18 and entering a market truck (not shown). The room is now reconfigured so that the gates are in the positions shown in FIG. 1, so that normal growing conditions will continue until the next market shipment is due. As indicated above, each removable free-standing gate is preferably held upright through the support of telescoping poles at each end. Through the just-described sorting system and method, hogs are able to sort themselves, with the producer taking responsibility only for scale settings and gate configurations, with the capability of sorting one pen per day in a one-room self-sorting hog facility.

Figure 6:
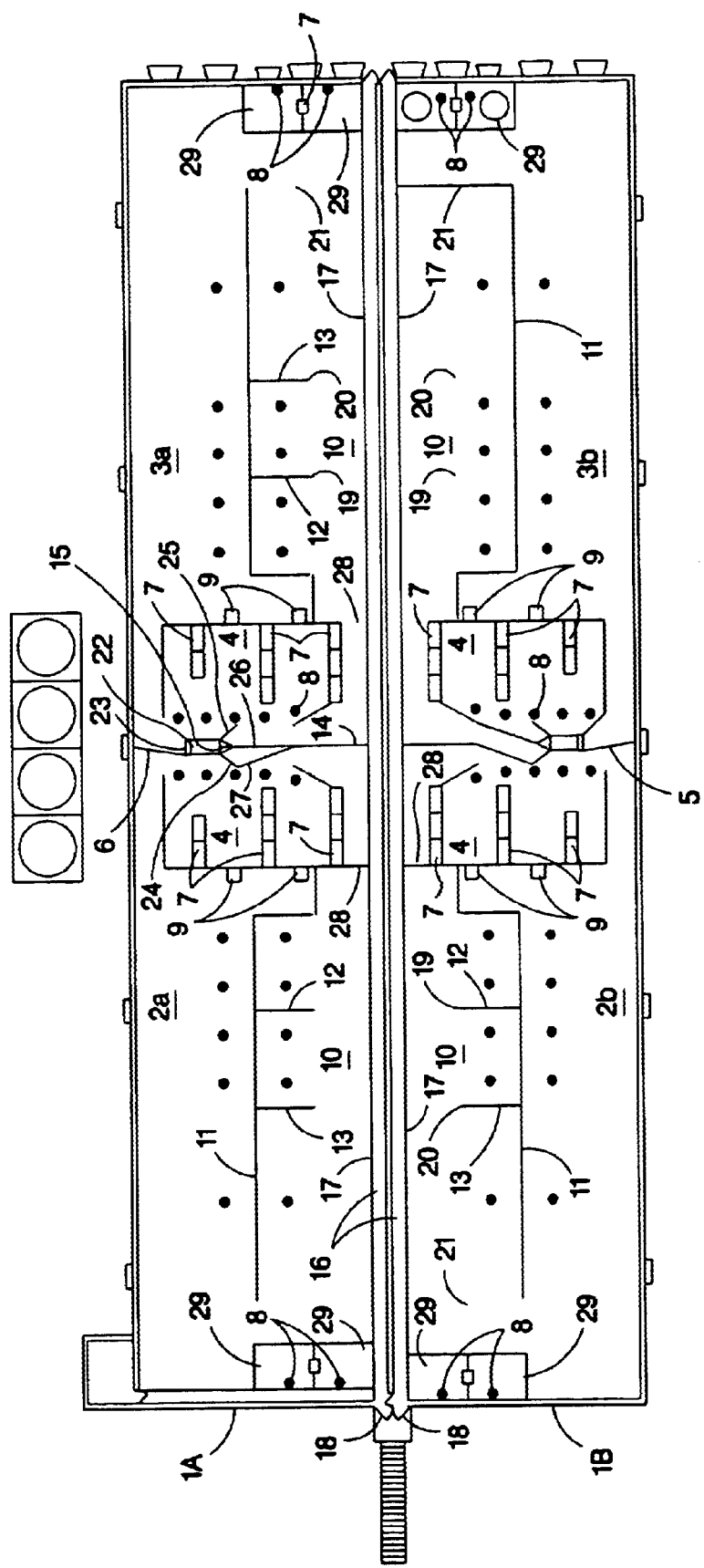
FIG. 6 is an overhead view of an entire two-room self-sorting hog facility similar to FIG. 1, with the uppermost room during normal growing conditions, and the lowermost room during hog sorting of the right pen.

While the hog management system has been described with reference to a single building having a room 1 divided into pens 2 and 3, as depicted in FIG. 6, more than one pen can be sorted in one day through the construction of a multi-room self-sorting hog facility. Room 1A is divided into pens 2a and 3a, while room 1B is divided into pens 2b and 3b. Sorting in each pen is carried out in the manner just described above. While FIG. 6 illustrates two such sorting facilities, it should be evident that three or more identical facilities can be situated side-by-side, thereby even further increasing the number of hogs which can be finished or sorted in a given day.

As will be evident from the above, the present invention, by its special hog sorting arrangement, allows the use of a single automatic hog sorting scale device to sort large numbers of market weight hogs from under weight hogs and confines the market weight hogs under minimum feed conditions, while under weight hogs are returned immediately to self feeding conditions. Large numbers of hogs can thus be caused to sort themselves with minimum attention and labor. In addition, the system requires the producer to purchase and maintain a minimal amount of equipment for a self-sorting operation, thereby increasing profits.

As indicated above, one advantage of growing hogs in larger pens rather than in smaller pens as is still common today is that fighting amongst hogs in each pen is minimized. This is because while a dominant hog in a smaller pen will fight with all of the other hogs until a so-called pecking order is established, in a large pen environment of several hundred animals it is impossible for one hog to dominate all of the other hogs and a pecking order with one dominant hog is never established. One consequence of less fighting in a large pen environment is a decreased number of injuries, and therefore overall healthier hogs and increased profits when they are sent to market. In addition, while hogs in smaller pens cannot be mixed or intermingled because the other hogs in the pen will fight with and eventually injure and possibly kill such hogs in large pen environments fighting does not occur even if new hogs are introduced or are intermingled between pens. Therefore, while in the embodiment of the invention shown FIGS. 1–6 hogs in pens 2 and 3 are not intermingled, the present inventor has now unexpectedly discovered that there are numerous advantages to sorting hogs not only in a single pen but between pens. Thus, the present inventor initially found that by placing a single scale between pens at opposite ends of a finishing building considerable expense can be saved, as such scale could then service both large pens in sorting into different parts of such penn at different times. Applicant has now discovered as noted, however, that placing the scale in the center allows special sorting routines that he has devised to be carried out between pens.

One advantage of eventual intermingling of hogs between pens is that castrated male hogs and female hogs, i.e. barrows and gilts, can be placed in separate pens initially, such as, for example, barrows in pen 2 and gilts in pen 3. This is advantageous because guts on average grow more slowly than barrows, and therefore can be initially fed a different, higher protein diet than the barrows to stimulate faster growth. When barrows and gilts are mixed together in the same pen, it is difficult if not impossible to ensure that the gilts receive a different feed or diet than the barrows. Therefore, barrows and guts would both be receiving a high protein diet, which is not cost effective since such feed is only required to be eaten by the gilts, and the high protein feed is more expensive than regular feed. In addition, if barrows and gilts are separated, different nutrients or electrolytes can also be added to the water supply of the gilts. Therefore, by initially separating the barrows and gilts the growth rates of such hogs can be more closely regulated and monitored, with the barrows growing at a normal rate eating regular feed and with the gilts growing as a faster than normal rate eating the higher protein feed.

Despite the separation of castrated male and female hogs into different pens, is well known, of course, that some barrows and some gilts will grow at faster and slower rates than others. Therefore, as an initial sort, once the guts have reach a weight of approximately 150 pounds, the gifts can be sorted by moving them across the scale and directing at least some of the heavier gilts in pen 3 into the barrow pen 2, while the light guts are directed back to the gilt hog pen 3 where they will continue to receive a higher protein diet or growth promoter such as palene. In addition, the barrows can be sorted in a similar manner, by moving them across the scale and directing the lighter barrows from pen 2 into the gilt pen 3 where they will benefit from the higher protein diet, while the heavier barrows are directed back to the same pen.

The ability to intermingling hogs between major pens also reduces the amount of gate and fencing equipment, and therefore cost, required in setting up such hog growing buildings. For example, as shown below, less gating and fencing is required since only one holding area is necessary. In addition, the alleyway through which the hogs are shunted on the way to loading on a truck for shipping to market does not have to extend along the entire length of the building, but only adjacent the single holding area and possibly along the sick pen area. Much shorter feed lines are also required, further reducing installation and maintenance costs. In addition, the amount of feed or feed ratio to be given to the hogs can be determined and provided. This is done by determining the average weight of such hogs from the scale readings, so that the growth curb of such animals can be determined and then utilized to provide a more specific food ratio. Another result, although not necessarily an advantage, is that it is not as important that the feeding area be placed directly in the center of the building or room. In fact, preferably the feeding area will be moved more towards the end of the building in which holding area has been removed, essentially so that there is sufficient room in the pen adjacent the holding area. Also, only a single sick pen is required, further saving on cost. Yet another advantage of moving the heavier gilts into the barrow pen is that there will now be more space for the lighter hogs to move around, and there will be less competition for food and the like. Market shipments can therefore be readied ahead of time, rather than at the last minute. Having additional room has been found to increase the growth rate of the animals. Sorting the larger animals into one pen, leaving the smaller animals in another pen from which the smaller animals are progressively moved leaving more and more room for the smaller animals encourages them therefore to grow faster and tend to catch up with the larger animals.

Figure 7:
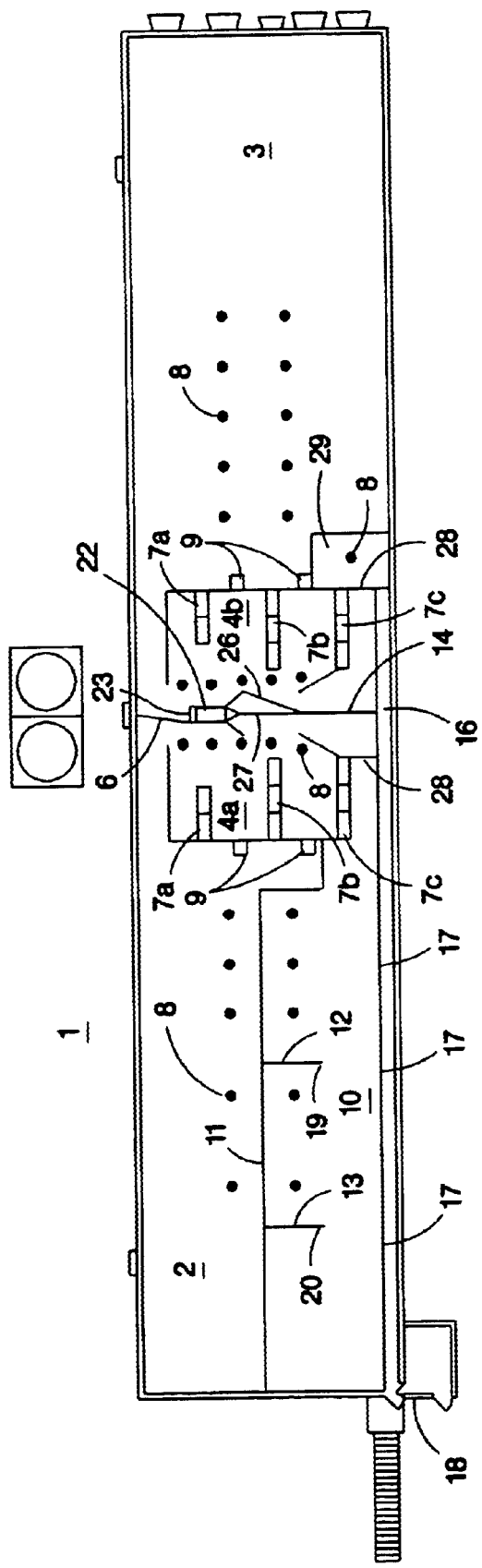
FIG. 7 is an overhead view of a second embodiment of an entire one-room self-sorting hog facility under normal growing conditions.

FIGS. 7–13 illustrate a second preferred embodiment of the automated hog management system and method for housing, feeding and sorting market hogs of the invention wherein, as indicated above, hogs can be intermingled and moved between pens depending upon their size and weight. FIG. 7 is an overhead view of such second embodiment of the single room self-sorting hog facility 1 of the invention which, similar to the first embodiment, is generally divided into separate large pens 2 and 3 which make up the facility under normal growing conditions. Contained within pens 2 and 3 are feeding areas 4a and 4b which, during normal growing conditions, are accessible from pens 2 and 3 respectively through openings left by the removal of gate 5, shown in FIGS. 8 and 9 placed between pen 3 and feeding area 4b and shown in FIGS. 10 and 11 placed between pen 2 and feeding area 4a. The floor of pens 2 and 3 and feeding areas 4a and 4b is preferably at least partially slatted so that waste and excrement passes between the slats into a pit or deposition area below the floor (not shown). As explained above, it is preferred that at least initially castrated male hogs (barrows) and female hogs (gilts) are placed in separate pens. For the purposes of illustration, it is assumed that barrows are placed in pen 2 and gilts are placed in pen 3.

Feeding areas 4a and 4b comprise a single feeding area situated between pens 2 and 3 which is made separate by, from bottom to top, the combination of stationary fence 14 extending inwardly from alleyway 16, removable gate 26 or 27, scale 22, and pivoting gate 6. Each feeding area 4a and 4b preferably contains three rows of feeders 7a, 7b, and 7c, all of which can be accessed on both sides by any hogs in such pens during normal growing conditions. Also positioned throughout living areas 2 and 3 and in feeding areas 4a and 4b are waterers 8, which waterers can be of any known type as described with reference to the first embodiment. From the feeding areas 4a and 4b, hogs can file back into pen areas 2 and 3 through one-way gates 9 or, under normal growing conditions, through the opening between the living areas and feeding areas left by the removal of gate 5. In addition, as in the first embodiment, electronic sorting scale 22 is usually made inaccessible to the hogs during normal growing times. However, just as was explained with reference to the first embodiment, it is also sometimes desirable to allow the hogs to pass into the feeding area through scale 22 during non-sorting periods so that they will, over time, learn to access the feeding area through such scale and then will freely and willingly enter the scale during sorting periods. Gate 6, which is pivotably connected between the outer wall of the hog building 1 and one side of the front of scale 22, prevents hogs in the pen on the other side of such gate from gaining access to the front of the scale, while entrance gate 23 prevents hogs in the other pen from accessing the scale.

Also shown in FIG. 7 is holding area 10, which is situated adjacent pen 2. During normal growing or non-sorting conditions, hogs in pen 2 may be allowed to roam freely throughout both pen area 2 and holding area 10. Note that there is no holding area situated adjacent pen 3 as in the first embodiment, as hogs in pen 3 are also sorted into holding area 10 adjacent pen 2, as will be explained below. Holding area 10 is formed by stationary horizontal fence 11, which extends generally centrally along a major portion of pen 2, and removable gates 12 and 13 which can be situated along at least three different points 19, 20, and 21 extending preferably at a right angle between fence 11 and alleyway 16, such position depending mainly upon the size of the sort for holding a quarter, half or whole truckload sort, respectively. In addition, only one sick pen area 29 is required into which sick or lame hogs from both pens 2 and 3 may be placed. Access to a feeder 7 and a waterer 8 is also provided in such sick area 29. In FIGS. 7–13, sick pen 29 is shown situated adjacent to feeding area 4b and feeder 7c, generally in the same position holding area 10b in the first embodiment shown in FIGS. 1–6 however, the sick pen may be situated in other areas of the building as long as sick animals are held separate from healthy animals.

Figure 8:
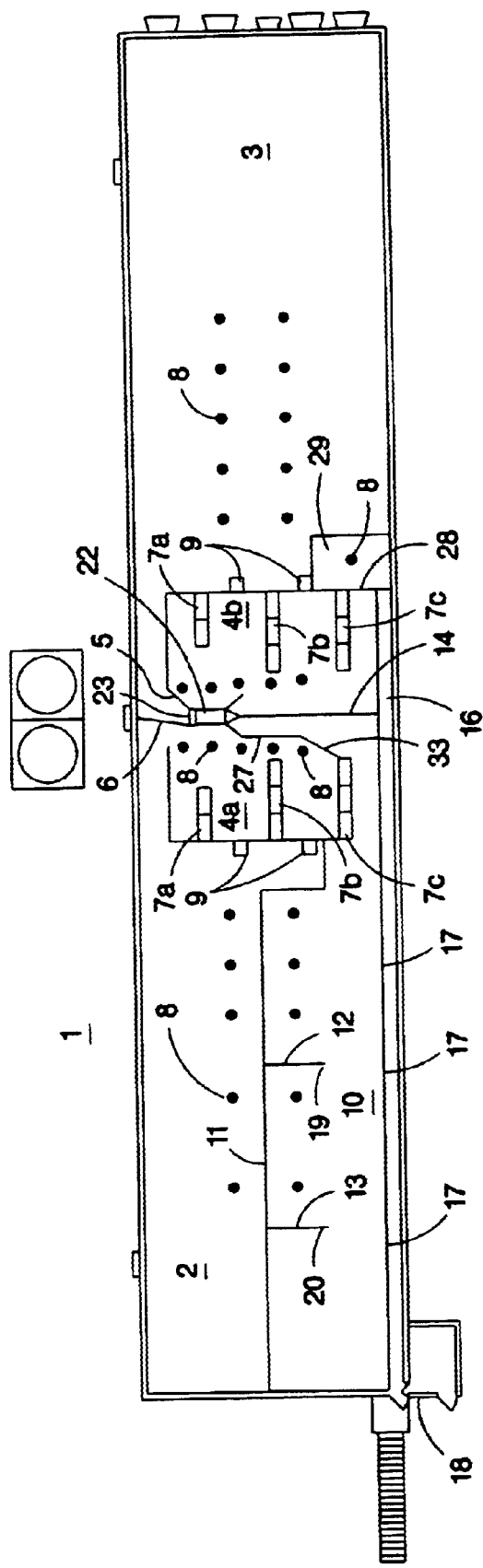
FIG. 8 is an overhead view of the entire one-room self-sorting hog facility of FIG. 7 as configured during hog sorting of the right side pen into the holding area on the left side of the building.
Figure 9:
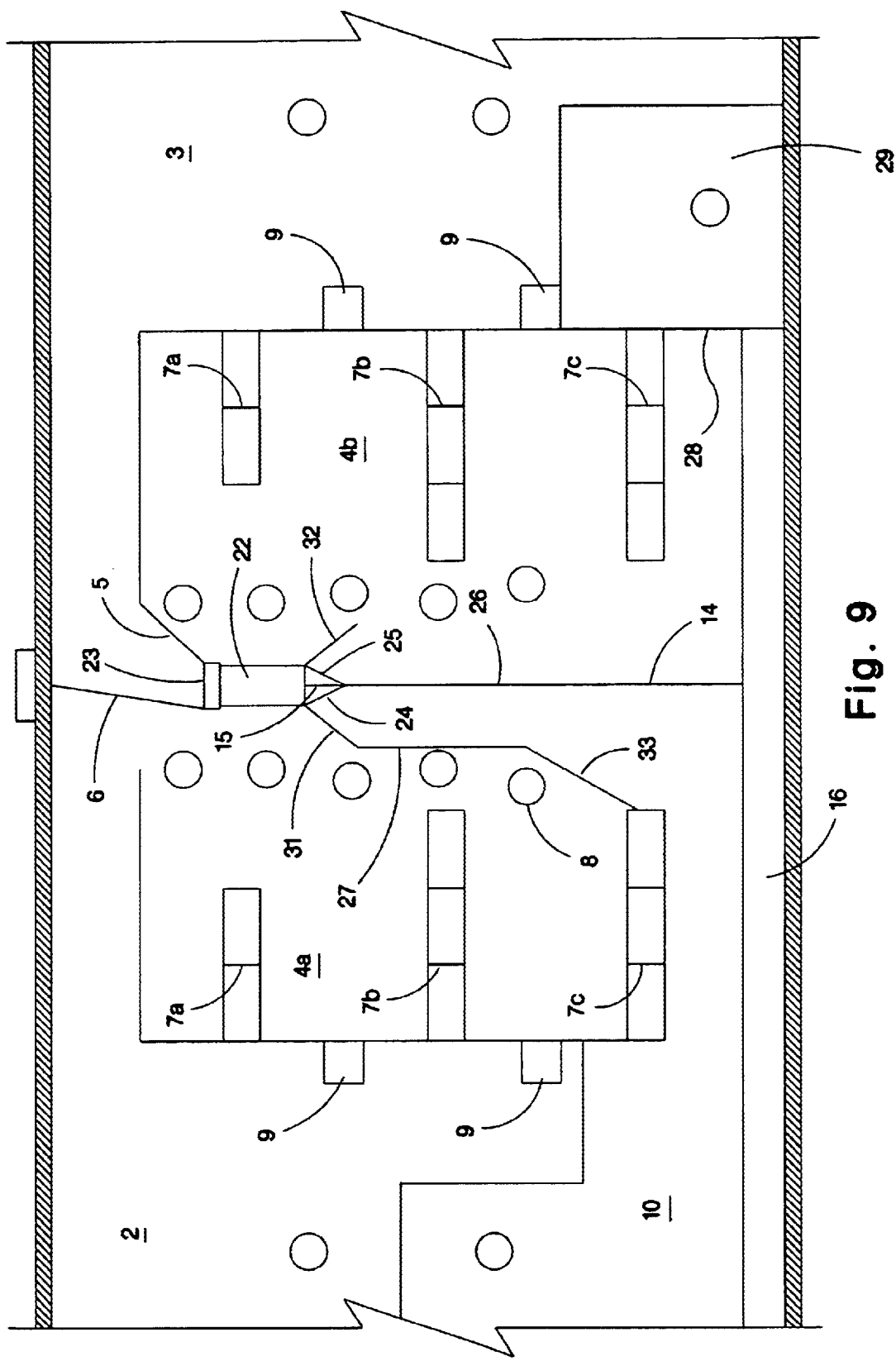
FIG. 9 is an overhead close up view of the feeding areas during hog sorting of the right side pen in the one-room self-sorting hog facility of FIG. 8.

FIG. 8 illustrates the single-room self-sorting hog facility 1 shown in FIG. 7 configured for sorting market weight hogs from pen 3 into holding area 10, while FIG. 9 is a closer, or close up, view showing the positioning of the fencing system around scale 22 during such sorting operation. During sorting of pen 3, hogs in pen 2 will continue normal feeding. Similar to the first embodiment, gate 5 is positioned between living area 3 and feeding area 4b so that the hogs are prevented from entering such feeding area through the opening now blocked by gate 5. In addition, gate 6 is positioned extending between the front side of scale 22 closest to pen 2 and the outer wall of building 1. Hogs in pen 3 are thereby prevented from entering feed area 4b by any other means except by crossing electronic sorting scale 22 through the corridor created by gates 5 and 6. Gate 23 positioned over the front of scale 22 is also removed prior to commencing sorting.

In addition to positioning gates 5 and 6 as just described, gate 26 is positioned with one end connected to the rear tip of the diversion gate portion of scale 22 and its other end connected to gate 14 extending from alleyway 16. At the same time, one end of gate 27 is connected to the free end of gate 31, which gate is attached on its other end to sorting scale 22, while the other end of gate 27 is connected to gate 33, thereby forming a corridor or passageway from scale 22 into holding area 10 between gates 26 and 14 on one side and gates 31, 27 and 33 on the other side.

Upon single file entrance on to scale 22, the hogs are weighed and determined to be either "heavy" or "light." If designated as "heavy," diversion gate 15 pivots so that access to opening 24 is allowed, whereby the "heavy" animal is directed into the corridor formed by the placement of gates 26 and 27 just described, and into holding area 10. Hogs in holding area 10 have access to one side of feeder row 7c in feeding area 4a as well as to several waterers 8, so that the producer now has complete and exclusive control over the diet of such "heavy" group of market hogs. Hogs in holding area 10 may also be prevented from accessing feeder 7c by placing gate 28 across the entrance to holding area 10, which gate is shown in FIGS. 8 and 9 across the front of sick pen 29.

If a hog is designated as "light" upon entrance on to scale 22 from pen 3, gate 15 pivots to allow access to exit or opening 25 leading back into the normal feeding area 4b for such pen. Hogs can now remain in the feed area or exit back into pen or living area 3 via one-way gates 9, and they will continue normal feeding and watering habits until being deemed "heavy" during a future sorting. As indicated above, for illustrative purposes hogs in pen 3 are being fed a high protein diet to enhance their rate of growth.

Figure 10:
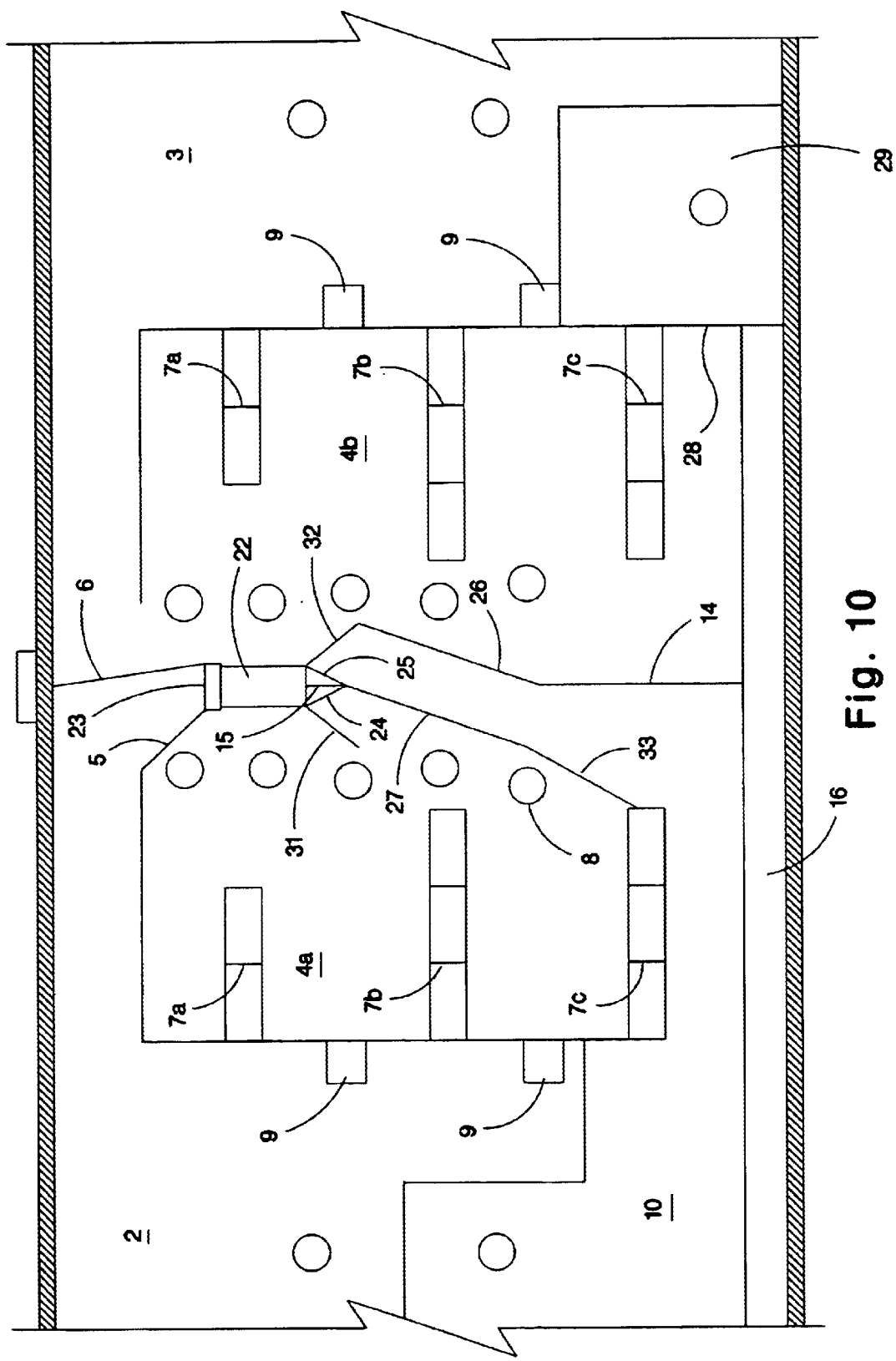
FIG. 10 is an overhead close up view of the feeding areas during hog sorting of the left side pen of the second one-room self-sorting hog facility.
Figure 11:
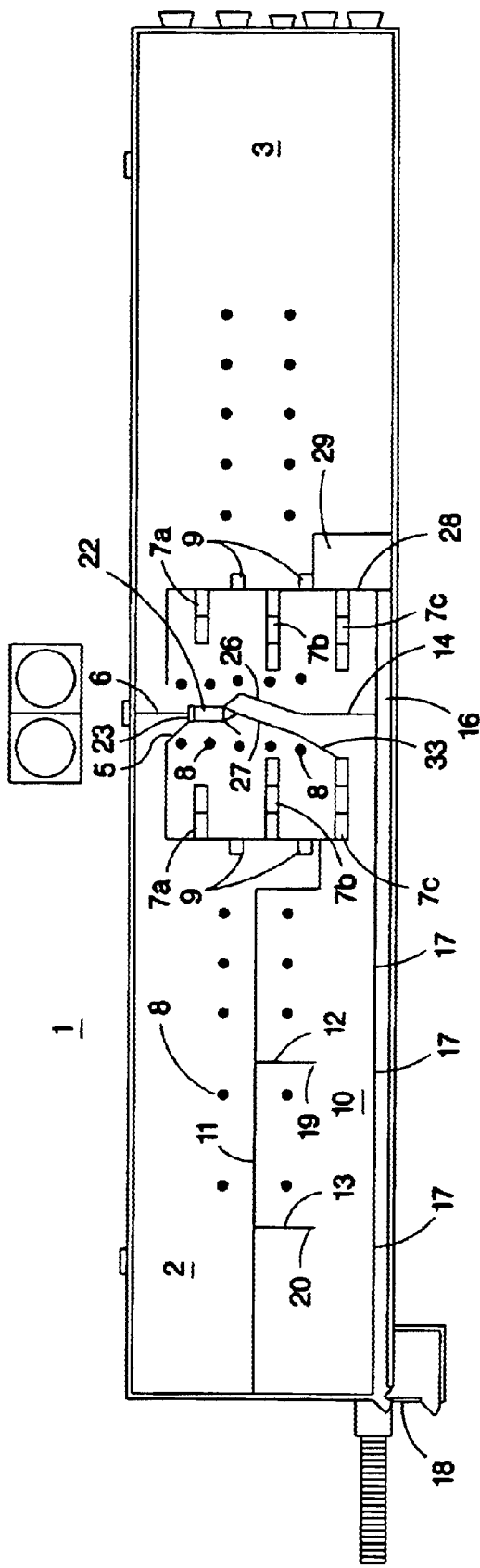
FIG. 11 is an overhead view of an entire one-room self-sorting hog facility as configured during hog sorting of the left side pen of the second embodiment.

Animals in holding area 10 will usually remain there until market truck pickup. However, as illustrated in FIGS. 10 and 11, in the second embodiment hogs in pen 2 will also typically be sorted into holding area 10 in a similar manner, so that market ready hogs in both pens 2 and 3 are sorted into the same holding area. This is accomplished by reversing the gating layout shown in FIGS. 8 and 9. Gates 5 and 6 are positioned so that the hogs in pen 2 can only enter feeding area 4a by passing through electronic sorting scale 22, with gate 23 now removed. Gate 5 is situated in the opening between living or pen area 2 and feeding area 4a, while gate 6 is positioned between the outer wall of hog building 1 and the front side closest to pen 3 of scale 22, forming a short corridor from pen 2 to scale 22. In addition, gate 26 is now pivoted so that it is connected between the free end of gate 32 and gate 14, while gate 27 is pivoted so that it is now secured between the rear tip of scale 22 and the free end of gate 33.

Upon single file entrance on to scale 22, hogs are weighed and determined to be either "heavy" or "light." If designated as "heavy," gate 15 pivots to allow access to opening 25, wherein the animals may travel down the corridor formed by the placement of gates 32, 26, and 14 on one side and gates 27 and 33 on the other side, and into holding area 10. As a result, hogs growing in both pens 2 and 3 have now been sorted into the same holding area 10, in contrast to sorting into separate holding areas 10a and 10b as in the first disclosed embodiment. If a hog from pen 2 is designated as "light" upon entrance to scale 22, gate 15 pivots to allow access to opening 24 so that such hog can gain access back into the normal feeding area 4a of pen 2, minus the holding pen feeder row side of feeder 7c. Such hogs can now exit feeding area 4a back into pen 2 via one-way gates 9, where they will continue normal growing, feeding and watering habits until deemed "heavy" during a future sorting.

When hogs in one or both of pens 2 and 3 have been sorted into holding pen 10 and the market truck arrives, "heavy weight" hogs will exit holding area 10 through one of gates 17 between such holding area and alleyway 16, which alleyway only runs along that portion of the side wall of building 1 adjacent holding area 10 up to sick pen area 29, rather than along entire length of the room 1 as in the previous embodiment. The hogs are then herded down alleyway 16, exiting through door 18 and into the market truck (not shown). The gating system can then be reconfigured depending upon what the next sorting operation to be undertaken might be.

Figure 12:
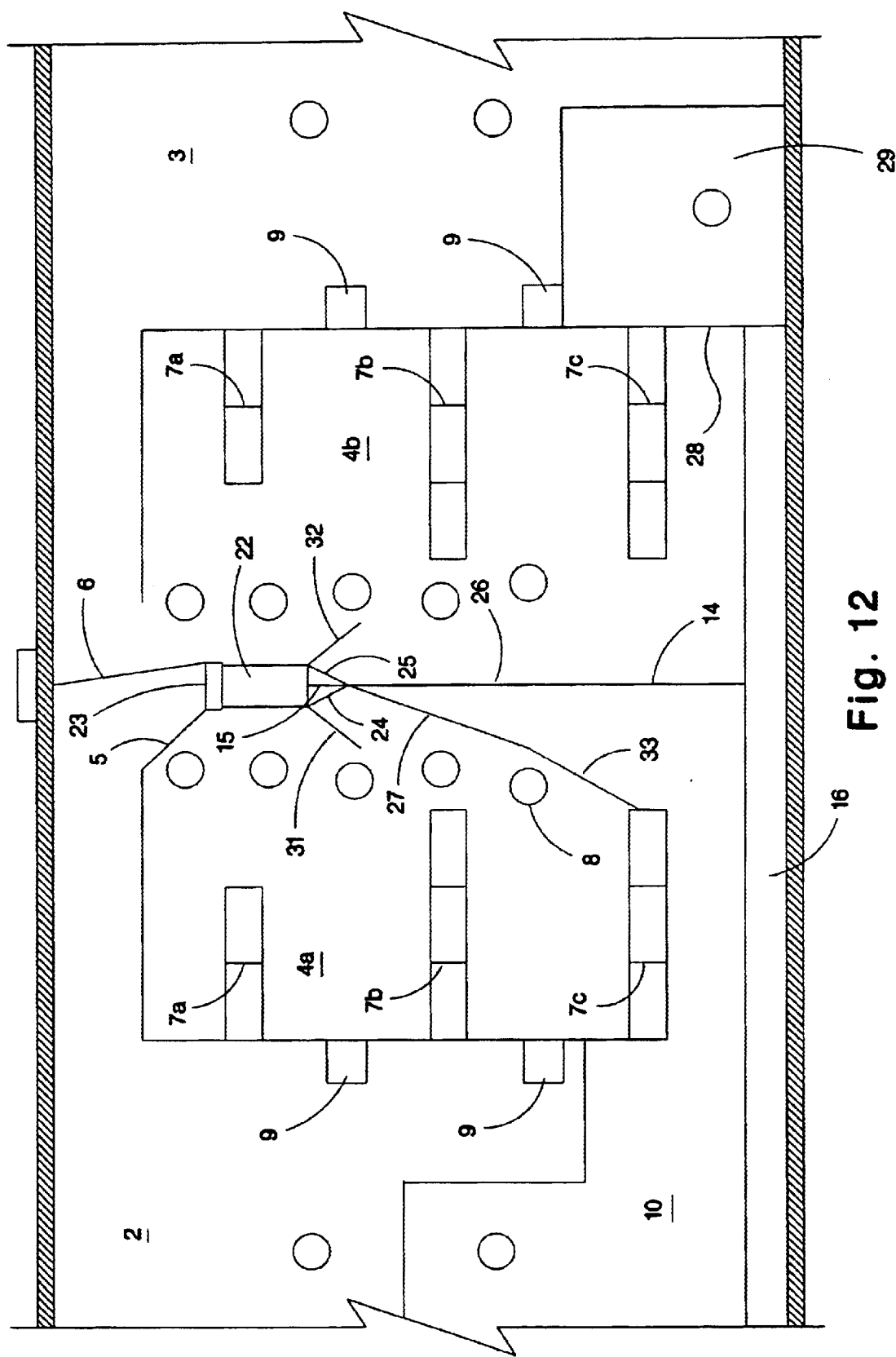
FIG. 12 is an overhead close up view of the hog facility as shown in FIG. 11 as configured during sorting of hogs from the left side pen into the right side pen.
Figure 13:
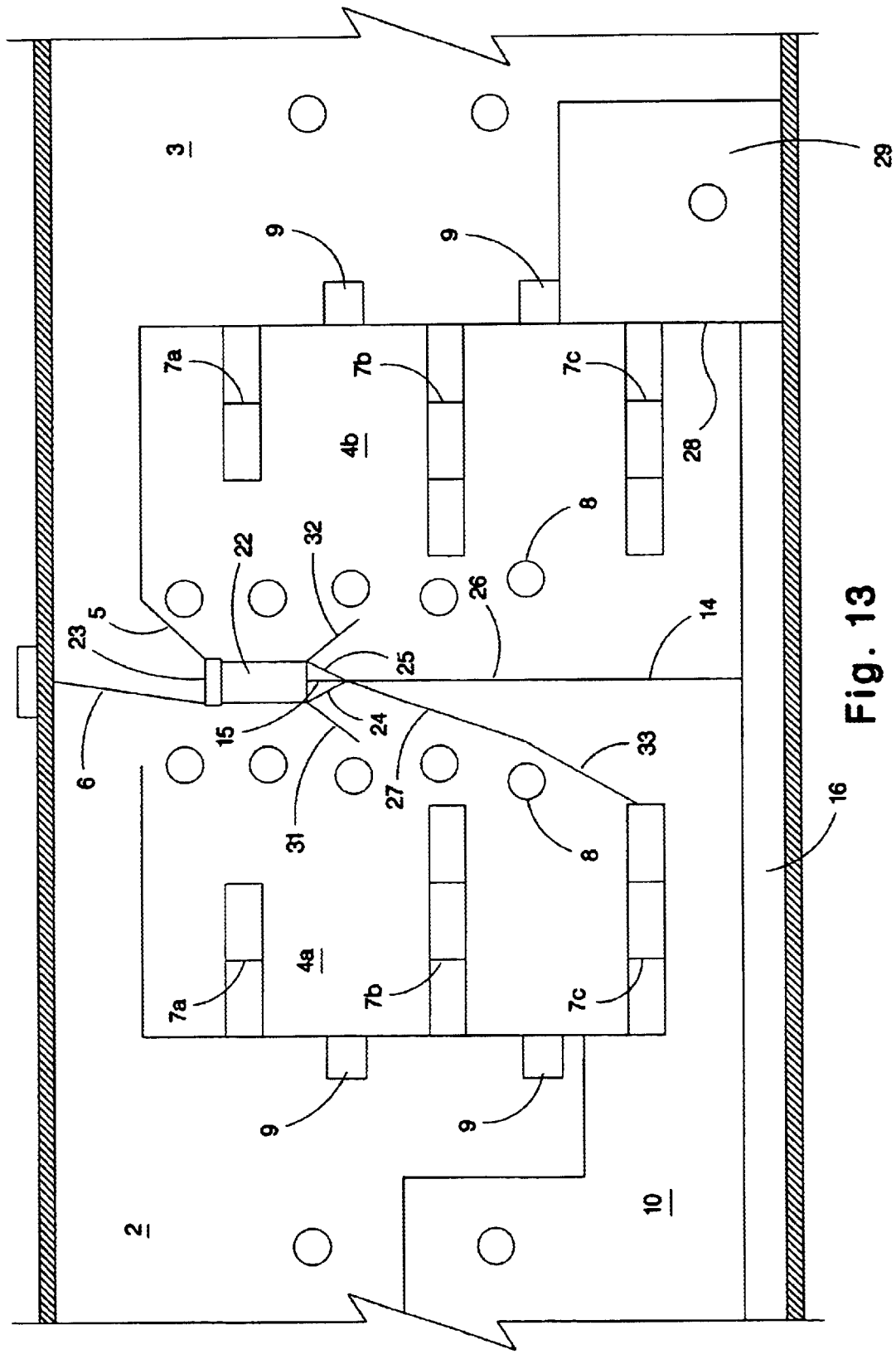
FIG. 13 is an overhead close up view of the hog facility as shown in FIG. 12 as configured during sorting of hogs from the right side pen into the left side pen.

FIGS. 8–11 illustrate that it is possible to sort hogs in pens 2 and 3 into a single holding area 10. However, as illustrated in FIGS. 12 and 13, hogs can also be sorted between pens 2 and 3 or from pen 2 to pen 3 and vice versa based on the weight of such animals, which sorting procedure or method is desirable in some circumstances. For example, assuming still that initially only barrows are growing in pen 2 and only gilts are growing in pen 3, the lightest or slowest growing barrows in pen 2, who are receiving normal feed, may benefit from or grow faster upon receiving a higher protein or other special feed, which is being fed to gilts in pen 3. To sort "lights" hogs, or hogs below a certain weight, from pen 2 into pen 3, similar to the arrangement shown in FIGS. 10 and 11, first gate 5 is positioned between living area 3 and feeding area 4a, and gate 6 is positioned extending between the side of scale 22 closest to pen 2 and the outer wall of building 1 so that only hogs in pen 2 can enter electronic sorting scale 22. In addition, gate 23 is removed from the front of scale 22, and gate 26 is moved so that it is connected between the rear tip of scale 22 on one end and on its other end to gate 14 extending from alleyway 16. Gate 27 is still preferably positioned between gate 33 and the rear tip of scale 22 thereby blocking entrance into holding area 10 from feeding area 4b. However, gate 27 may also be removed if desired.

Upon single file entrance on to scale 22 from pen 2, the hogs are weighed and determined to be either "heavy" or "light." If designated as "heavy," gate 15 pivots so that access to opening 24 is allowed, thereby enabling the hog to enter feeding area 4a. in the usually manner. However, if a hog is designated as "light" upon entrance on to scale 22 from pen 2, gate 15 pivots to allow access to opening 25, leading hogs from pen 2 into feeding area 4b of pen 3. Hogs originally in pen 2 but now in feeding area 4b, where they will preferably have access to higher protein feed or the like, can then enter pen or living area 3 via one-way gates 9, Even if the feed available in feeding area 4a is the same as in 4b, it still may be desirable to sort hogs according to weight between pens prior to such hogs reaching market weight, such as simply to make the ultimate market sorting process less timely. In addition, it has been found that if hogs having a similar weight range are passed through the scale, there is less need to continually recalibrate the scale.

FIG. 13 illustrates a gate and fencing arrangement for sorting hogs from pen 3 either into feeding area 4a and pen 2 or into feeding area 4b and pen 3 in the usual manner. Gates 5 and 6 are adjusted to provide access to scale 22 from pen 3 as described above. In addition, gate 23 is removed from the front of scale 22, while gates 26 and 27 remain situated as if sorting was being performed from pen 2 into either feeding areas 4a or 4b as shown in FIG. 12. Upon single file entrance on to scale 22, the hogs are again weighed and determined to be either "heavy" or "light." If designated as "heavy," gate 15 pivots so that access to exit or opening 24 is allowed, thereby enabling hogs from pen 3 to enter feeding area 4a. However, if a hog is designated as "light" upon entrance on to scale 22 from pen 3, gate 15 will pivot to allow access to exit or opening 25 leading such hogs back into feeding area 4b of pen 3. Such hogs can then re-enter pen or living area 3 via one-way gates 9, where they will continue growing as before.

Through the just-described sorting system and method, hogs are trained or made to sort themselves, with the producer having to monitor only scale settings and gate configurations. The system has the capability of sorting one pen per day in a one-room self-sorting hog facility as shown in the first embodiment, or sorting of hogs between pens as shown in FIGS. 12 and 13 in the second embodiment whenever desired. For example, after a shipment of hogs has been sent to market, the producer can immediately begin preparing the next shipment by moving "heavy" hogs from either pen 2 or pen 3 into holding area 10. Next, the scale can be recalibrated so that slightly lighter but almost market weight hogs from pen 3 are moved into pen 2 with the other almost market weight hogs, where such group can be constantly monitored. In addition, slower growing hogs in pen 2 can be moved to pen 3 using the scale at virtually any time or during any period. As a result of such arrangement, a hog farmer now has complete control over and can individually manage the growth of every animal in each pen. Each hog can be visually inspected from a single position rather than having to walk around and look in each small pen as in the old but still prevalent practice of hog farming. In addition, information about each hog or the hogs as a whole may be collected and used to control and fine tune the feed or watering operations.

Figure 14:
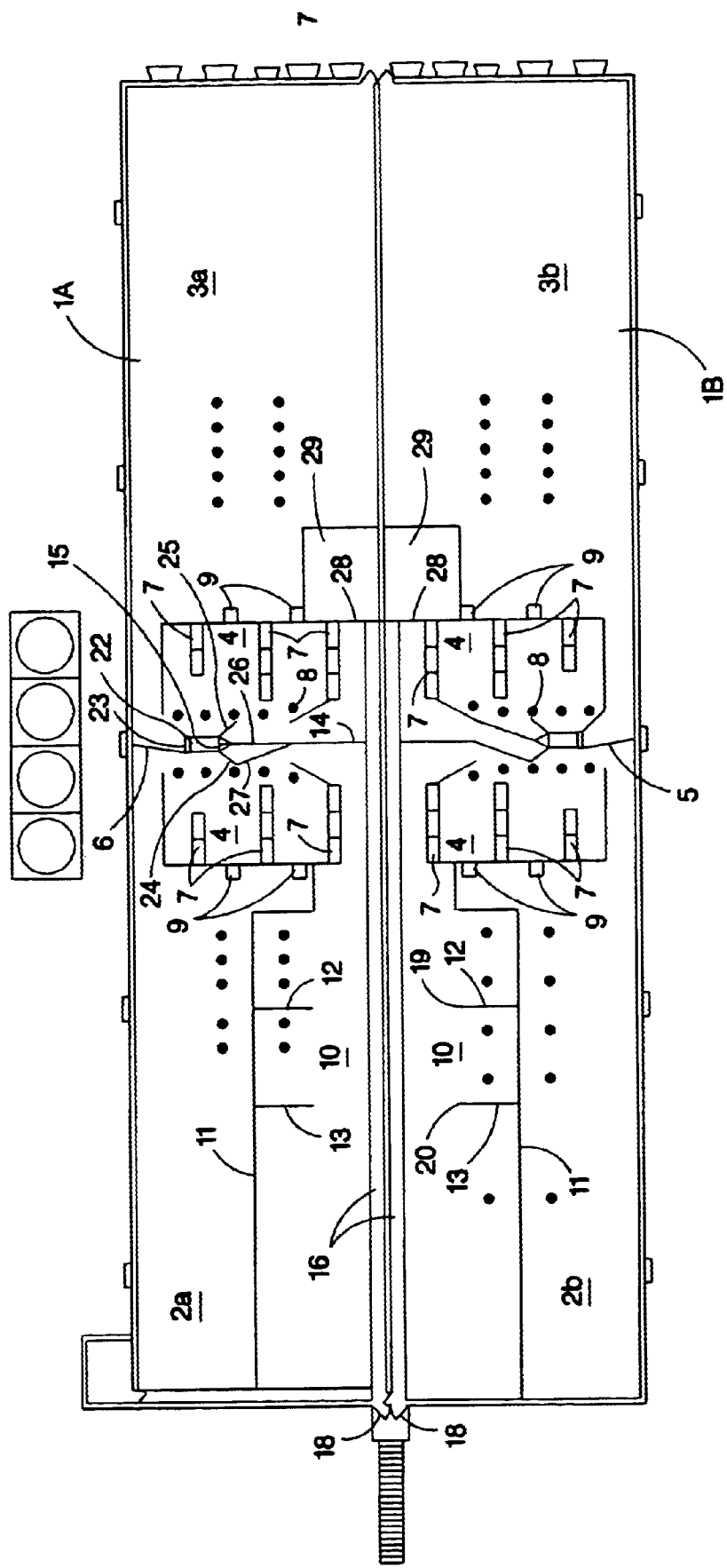
FIG. 14 is an overhead view of an entire two-room self-sorting hog facility using the second embodiment of the invention, with the uppermost room during normal growing conditions, and the lowermost room during hog sorting of the right pen.

As illustrated in FIG. 14, several pens can be sorted in one day using the second sorting arrangement shown in FIGS. 7–13 through the construction of multi-room self-sorting hog facilities. Room 1A is divided into pens 2a and 3a, while room 1B is divided into pens 2b and 3b. Sorting in each pen is carried out in the manner just described above. While FIG. 14 illustrates two such sorting facilities, it should be evident that three or more identical facilities can be situated side-by-side, thereby even further increasing the number of hogs which can be finished or sorted in a given day. In addition, it should be evident that the decreased labor, maintenance and set up costs associated with the present inventor's hog management system are multiplied in a multi-building arrangement.

As will be evident from the above, the present invention by its special hog sorting arrangement allows the use of a single automatic hog sorting scale device to sort large numbers of market weight hogs from under weight hogs and confine the market weight hogs under minimum feed conditions, while under weight hogs are returned immediately to self feeding conditions. Large numbers of hogs can thus be caused to sort themselves with minimum attention and labor. In addition, the system requires the producer to purchase and maintain a minimal amount of equipment for a self-sorting operation, thereby increasing profits, while allowing the producer to manage each hogs growth individually as well as the building as a whole.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

Having described the invention, I claim:

1. A hog management system comprising:
   (a) a hog finishing building including a pair of side walls, ends walls joined to the side walls to form an enclosure, and a roof covering said enclosure;
   (b) a floor area in the enclosure, said floor area partitioned into two separate hog pen areas each having separate living areas;
   (c) a feeding area located centrally between said hog pen areas, said feeding area divided into first and second separate sections;
   (d) fencing and gate means for restricting movement between said pen areas and said feeding area
   (e) at least one holding area wherein hogs can be held separate from the feeding or pen areas;
   (f) a device for weighing and sorting hogs positioned adjacent the feeding area and arranged so that hogs from either pen area may be separately passed through said device, the device further having a gate means for diverting hogs through one of two exit openings leading into one of said first or second feeding areas or into said holding area as desired.

2. A hog management system in accordance with claim 1 wherein said system is self sorting.

3. A hog management system in accordance with claim 1 wherein hogs in said holding area also can access at least a portion of one section of said feeding area.

4. A hog management system in accordance with claim 1 additionally comprising a gate means for blocking access of hogs in said holding area to said feeding areas.

5. A hog management system in accordance with claim 1 wherein upon exiting one of the sections of the feeding area, hogs originally in one of said separate hog pen living areas are diverted into the other of said hog pen living areas.

6. A hog management system in accordance with claim 5 wherein hogs are diverted between hog pen living areas depending upon the weight of each hog.

7. A hog management system in accordance with claim 5 wherein hogs are diverted between hog pen living areas depending upon the average daily weight gain of each hog.

8. A hog management system in accordance with claim 5 wherein the sorting precision of each sorting process is improved by diverting hogs between hog pen living areas based on the weight of the hogs, thereby requiring less recalibration and maintenance of said electronic weighing and sorting device.

9. A hog management system in accordance with claim 8 wherein the growth rate on average of lower weight hogs is improved by diverting hogs between hog pen living areas based on the weight of the hogs, thereby providing lower weight hogs with additional room in one of said hog pen living areas.

10. A method of sorting hogs selected from a plurality of hogs in a hog finishing building using a single electronic sorting scale, said building being partitioned into two separate pens each having a living area and centrally located feeding areas adjacent each other with the scale positioned along the dividing line between pens, comprising the steps of:
   configuring a separate holding area within a portion of the living area and feeding area of the first pen using removable and interchangeable gates;
   blocking access to the feeding area from the living area of the first pen other than by passing through the electronic sorting scale;
   allowing hogs to pass from the living area in the first pen into the electronic sorting scale, wherein if the weight of the hog is at or above the predetermined market weight, a diversion gate herds the hog to the holding area, and it the weight of a hog is below the predetermined market weight, the hog the diversion gate herds the hog into the feeding area.

11. The method of sorting hogs in accordance with claim 10 comprising the additional steps of:
   reconfiguring the gates in the first pen to their position during normal growing conditions;
   blocking access to the feeding area from the living area of the second pen other than by passing through the electronic sorting scale;
   configuring the gates so that an alleyway leading from the sorting scale to the holding area is created;
   allowing the hogs to pass from the living area of the second pen into the electronic sorting scale, wherein the weight of the hogs is measured against a predetermined market weight, and wherein if the weight of a hog is at or above the predetermined market weight, a diversion gate herds the hog to the alleyway leading to the holding area, and if the weight of a hog is below the predetermined market weight the diversion gate herds the hog into the feeding area.

12. The method of sorting hogs in accordance with claim 10 comprising the additional step of:
   providing hogs in the holding area with a waterer containing watered electrolytes.

13. A method of sorting hogs selected from a plurality of hogs in a hog finishing building using a single electronic sorting scale, said building being partitioned into two separate pens each having a living area and centrally located feeding areas adjacent each other with the scale positioned along the dividing line between pens, comprising the steps of:
   configuring a separate holding area within a portion of the living area and feeding area of the first pen using removable and interchangeable gates;
   configuring the pens so that only hogs in the first pen can pass into the electronic sorting scale, wherein the weight of the hogs is measured against a predetermine market weight, and wherein if the weight of the hog is at or above the predetermined market weight, a diversion gate herds the hog to a holding area, and if the weight of a hog is below the predetermined market weight, the diversion gate herds the hog back into the first pen feeding area; and
   reconfiguring the pens so that only hogs in the second pen are able to pass into the electronic scale, wherein the weight of the hogs is measured against a predetermined market weight, and wherein if the weight of the hog to the same holding area as the hogs in the first pen, and if the weight of a hog is below the predetermined market weight, the diversion gate herds the hog into the second pen feeding area.

14. The method of sorting hogs in accordance with claim 13 comprising the additional steps of:

configuring the gates so that only hogs in the second pen can pass into the electronic sorting scale, and upon exiting are diverted either into the feeding area of the first pen if their weight is greater than a predetermine weight, or back into the feeding area if their weight is less than a predetermined weight.

15. The method of sorting hogs in accordance with claim 13 comprising the additional steps of:

configuring the pens so that only hogs in the first pen can pass into the electronic sorting scale, and upon exiting are diverted either into the feeding area of the first pen if their weight is greater than a predetermined weight, or into the feeding area for the second pen if their weight is less than a predetermined weight.

16. The method of sorting hogs in accordance with claim 13 comprising the additional step of:

providing the hogs in the second pen with a specialized diet as compared with hogs in the first pen.

17. The method of sorting hogs in accordance with claim 13 comprising the additional step of:

upon commencement of the growing operation, placing only barrow in the first pen, and only gilts in the second pen.

18. The method of sorting hogs in accordance with claim 13 comprising the additional step of:

prior to sorting the hogs, allowing the hogs to pass through the electronic scale into the feeding area during normal feeding operations so that the hogs learn that they can access the feeding area via the scale.

* * * * *